United States Patent
Moon et al.

(10) Patent No.: US 8,762,997 B2
(45) Date of Patent: Jun. 24, 2014

(54) CONSTRAINT-CONSCIOUS OPTIMAL SCHEDULING FOR CLOUD INFRASTRUCTURES

(75) Inventors: Hyun Jin Moon, Newark, CA (US); Yun Chi, San Jose, CA (US); V. Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 196 days.

(21) Appl. No.: 12/818,514

(22) Filed: Jun. 18, 2010

(65) Prior Publication Data

US 2011/0173038 A1 Jul. 14, 2011

Related U.S. Application Data

(60) Provisional application No. 61/294,246, filed on Jan. 12, 2010, provisional application No. 61/294,254, filed on Jan. 12, 2010.

(51) Int. Cl.
*G06F 9/46* (2006.01)

(52) U.S. Cl.
USPC ........... 718/102; 718/100; 718/107; 718/108; 710/54; 705/7.11

(58) Field of Classification Search
USPC .................... 718/100, 102, 107, 108; 710/54; 705/7.11
See application file for complete search history.

(56) References Cited

U.S. PATENT DOCUMENTS 7,480,913 B2 * 1/2009 Buco et al. .................... 718/105

OTHER PUBLICATIONS

Liu Zhen, Squillante Mark S, Wolf Joel L, 2001, Maximizing Service-Level-Agreement Profits, ACM Conference on Electronics Commerce, pp. 213-223.*
Guirguis Shenoda, Sharaf Mohamed A, Chrysanthis Panos K, Labrinidis Alexandros, Pruhs Kirk, 2009, Adaptive Scheduling of Web Transactions, CS Department University of Pittsburgh, pp. 1-12.*
Seon Hyun Choi, Lee Dong Ho, 2008, Scheduling algorithms to minimize the number of tardy jobs in two-stage hybrid flow shops, Computer and Industrial Engineering, 56, pp. 113-120.*
Hu Jiang, Alpert Charles J, Quay Stephen T, Gandham Gopal, 2003, Buffer Insertion with Adaptive Blockage Avoidance, IEEE Transactions on Computer Aided Design of Integrated Circuits and Systems, vol. 22, No. 4, pp. 492-498.*

(Continued)

*Primary Examiner* — Jonathan G Sterrett
*Assistant Examiner* — Stephen S Swartz
(74) *Attorney, Agent, or Firm* — Joseph Kolodka

(57) ABSTRACT

Systems and methods are disclosed to schedule jobs in a cloud computing infrastructure by receiving in a first queue jobs with deadlines or constraints specified in a hard service level agreement (SLA); receiving in a second queue jobs with a penalty cost metric specified in a soft SLA; and minimizing both constraint violation count and total penalty cost in the cloud computing infrastructure by identifying jobs with deadlines in the first queue and delaying jobs in the first queue within a predetermined slack range in favor of jobs in the second queue to improve the penalty cost metric.

19 Claims, 6 Drawing Sheets

(56) References Cited

OTHER PUBLICATIONS

Kuo Tei Wei, Wei Chih Hung, Lam Kam Yiu, 2000, Real Time Access Control and Reservation on B-Tree Indexed Data, Real Time Systems, vol. 19, pp. 245-282.*

Balbastre Patricia, Ripoll Ismael, Crespo Alfons, 2008, Minimum deadline calculation for periodic real-time tasks in dynamic priority systems, Department of Computer Engineering Technical University of Valencia Spain. pp. 1-14.*

Muller Hannemann Matthias Zimmermann Ute, 2003, Slack Optimization of Timing Critical Nets, Research Institute of Discrete Mathmatics, Rheinische Friedrich Wilhelms Universitat Bonn, pp. 1-13.*

Zhang Li, Ardagna Danilo, 2004, SLA Based Profit Optimization in Automatic Computing Systems, ICSOC, pp. 173-182.*

Peha Jon, Tobagi Fouad, 1996, Cost Based Scheduling and Dropping Algorithms to Support Integrated Services, IEEE Transactions on Communications, vol. 44, No. 2, pp. 192-202.*

Gupta Chetan Mehta Abhay, Wang Song Dayal Umesh, 2009, Fair Effective and Efficient Differentiated Scheduling in an Enterprise Data Warehouse, Hewlett Packard Labs, pp. 1-12.*

Peha Jon M and Tobagi Fouad A, 1991, A cost based scheduling algorithm to support integrated services, Stanford University, Department of Electrical Engineering, pp. 741-753.*

S. Guirguis, et al., Adaptive scheduling of web transactions. In ICDE, pp. 357-368, 2009.

Z. Liu, et al., On maximizing service-level-agreement profits. In ACM Conference on Electronic Commerce, 2001.

C. Gupta, et al., Fair, effective, efficient and differentiated scheduling in an enterprise data warehouse. In EDBT, pp. 696-707, 2009.

J. M. Peha, et al., Cost-based scheduling and dropping algorithms to support integrated services. IEEE Transactions on Communications, 44(2):192-202, 1996.

L. Zhang, et al., SLA based profit optimization in autonomic computing systems. In ICSOC, pp. 173-182, 2004.

* cited by examiner

CONSTRAINT-CONSCIOUS OPTIMAL SCHEDULING FOR CLOUD INFRASTRUCTURES

This application claims priority to U.S. Provisional Application Ser. Nos. 61/294,246 and 61/294,254, both filed on Jan. 12, 2010, the contents of which are incorporated by reference.

BACKGROUND

This application relates to Constraint-Conscious Optimal Scheduling for Cloud Infrastructures.

Cloud computing has emerged as a promising computing platform with its on-demand scaling capabilities. Typically, a cloud service delivery infrastructure is used to deliver services to a diverse set of clients sharing the computing resources. By providing on-demand scaling capabilities without any large upfront investment or long-term commitment, it is attracting a wide range of users, from web applications to Business Intelligence applications. The database community has also shown great interest in exploiting this new platform for scalable and cost-efficient data management. Arguably, the success of cloud-based services depends on two main factors: quality of service that are identified through Service Level Agreements (SLAs) and operating cost management.

Users of cloud computing services are not only able to significantly reduce their IT costs and turn their capital expenditures to operational expenditures, but also able to speed up their innovation capabilities thanks to the on-demand access to vast IT resources in the cloud. While the cloud computing offers the clients all these advantages, it creates a number of challenges for the cloud service providers who try to create successful businesses: they have to handle diverse and dynamic workloads in a highly price-competitive way, to convince the potential clients to use the service delivery model instead of in-house hosting of IT functions. In addition, the quality of service should be comparable in all aspects to the capabilities that can be delivered off of an IT infrastructure under full control of clients. Thus, the success of cloud-based services arguably depends on the two major factors: quality of service, which is captured as Service Level Agreements (SLAs) and operational cost management.

The consistent delivery of services within SLAs is crucial for sustained revenue for the service provider. Delivering those services incurs operational costs and the difference between the revenue and the operational costs is the service provider's profit, which is required for any commercially viable businesses.

The total profit, P, of the cloud service provider is defined as $$P = \sum_i r_i - C,$$

where $r_i$ is the revenue that can be generated by delivering the service for a particular job i and C is the operational cost of running the service delivery infrastructure. The revenue, R, is defined for each job class in the system. Each client may have multiple job classes based on the contract. A stepwise function is used to characterize the revenue as shown in FIG. 1. Intuitively, the clients agree to pay varying fee levels for corresponding service levels delivered for a particular class of requests, i.e., job classes in their contracts. For example, the client may be willing to pay a higher rate for lower response times. As shown in FIG. 1, the client pays $R_0$ as long as the response time is between 0 and $X_1$, and pays $R_1$ for the interval of $X_1$ and $X_2$, and so on. This characterization allows more intuitive interpretation of SLAs with respect to revenue generation. Once the revenue function is defined, the revenue function defines a cost function, called SLA cost function. If the level of services changes, the amount that the provider can charge the client also changes according to the contract. Due to the limitations on the availability of infrastructure resources, the cloud service provider may not be able or choose to attend to all client requests at the highest possible service levels. Dropping/Increasing service levels cause loss/increase in the revenue. The loss of potential revenue corresponds to SLA cost. For example, there is no revenue loss, hence no SLA penalty cost, as long as response time is between 0 and $X_1$ in FIG. 1. Likewise, increasing the amount of infrastructure resources to increase service levels results in increased operational cost. As a result, the key problem for the provider is to come up with optimal service levels that will maximize its profits based on the agreed upon SLAs.

SLAs in general may be defined in terms of various criteria, such as service latency, throughput, consistency, security, etc. One embodiment focuses on service latency, or response time. Even with latency alone, there can be multiple specification methods:

Mean-value-based SLA (MV-SLA): For each job class, quality of service is measured based on mean response time. This is the least robust type of SLAs from the customers' perspective.

Tail-distribution-based SLA (TD-SLA): For each job class, quality of service is measured in terms of the portion of jobs finished by a given deadline. For instance, a user may want 99% of job to be finished within 100 ms.

Individual-job-based SLA (IJ-SLA): Quality of service is measured using the response time of individual jobs. Unlike MV-SLA or TD-SLA above, in IJ-SLA any single job with a poor service quality immediately affects the measured quality of service and incurs some SLA penalty cost.

For each specification method, the SLA can be classified either as a hard SLA or a soft SLA as follows.

Hard SLA: A hard SLA has a single hard deadline to meet, and if the deadline missed, it is counted as a violation. The definition of this type of SLA, or constraint, may come from the client or the cloud service provider. There are cases where a cloud provider needs to use Hard SLAs as a tool to control various business objectives, e.g., controlling the worst case user experience. Therefore the violation of a hard SLA may not correspond to financial terms in the client contracts.

Soft SLA: A soft SLA corresponds to agreed levels of service in the contract. This is different from the hard SLA in that even after the violation, SLA penalty cost may continue to increase as response time further increases. Although the SLA penalty cost may have various shapes, stepwise function is a natural choice used in the real-world contracts. SLAs in general may be defined in terms of various criteria, such as service latency, throughput, consistency, security, etc.

The unit of operational cost is a server cost per hour. Consequently, the total operational cost, C, is the sum of individual server costs for a given period of time. The individual server cost is the aggregation of all specific costs items that are involved in operating a server, such as energy, administration, software, among others. Conventional scheduling systems typically rely on techniques that do not primarily

SUMMARY

In a first aspect, systems and methods are disclosed to schedule jobs in a cloud computing infrastructure by receiving in a first queue jobs with deadlines or constraints specified in a hard service level agreement (SLA); receiving in a second queue jobs with a penalty cost metric specified in a soft SLA; and minimizing both constraint violation count and total penalty cost in the cloud computing infrastructure by identifying jobs with deadlines in the first queue and delaying jobs in the first queue within a predetermined slack range in favor of jobs in the second queue to improve the penalty cost metric.

In a second aspect, systems and methods are disclosed for efficient maintenance of job prioritization for profit maximization in cloud-based service delivery infrastructures with multi-step cost structure support by breaking multiple steps in the SLA of a job into corresponding cost steps; generating a segmented cost function for each cost step; creating a cost-based-scheduling (CBS)-priority value associated with a validity period for each segment based on the segmented cost function; and choosing the job with the highest CBS priority value.

Advantage of the preferred embodiments may include one or more of the following. The system provides a very efficient job prioritization for diverse pricing agreements across diverse clients and heterogeneous infrastructure resources. In cloud computing infrastructures, the system enables profit optimization, which is a vital economic indicator for sustainability. The system considers discrete levels of costs corresponding to varying levels of service, which is more realistic in many real-life systems. The system is also efficient and low in computational complexity to be feasible for high volume and large infrastructures.

DESCRIPTION

Figure 1:
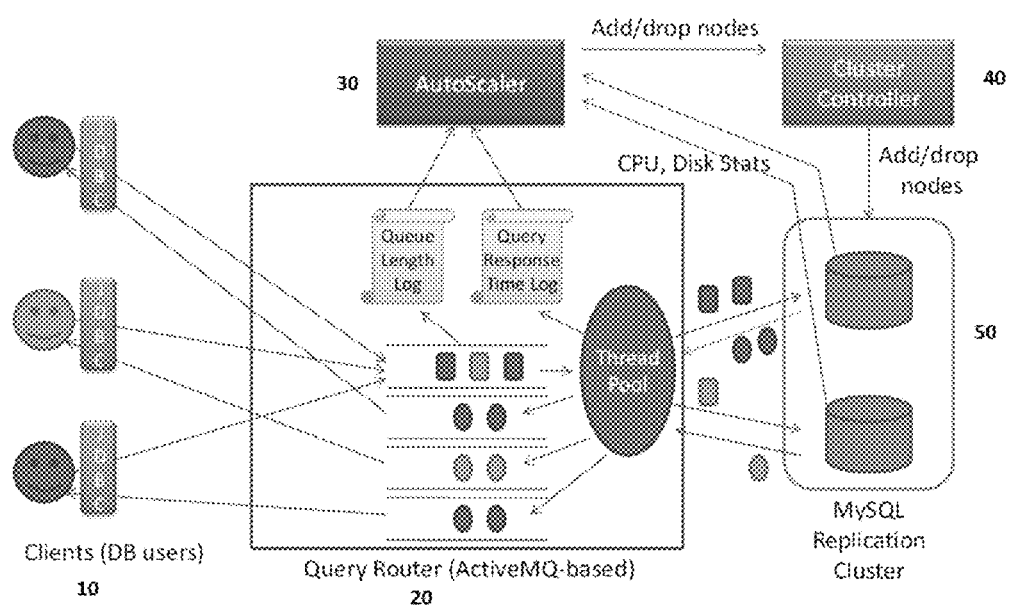
FIG. 1 shows an exemplary system diagram of an Intelligent Cloud Database Coordinator (ICDC).

FIG. 1 shows an exemplary system diagram of the ICDC. The ICDC manages very large cloud service delivery infrastructures. The system architecture focuses on components that are relevant and subject to optimization to achieve the goal of SLA-based profit optimization of resource and workload management in the cloud databases. The use of distinctively optimizing individual system components with a global objective in mind provides a greater degree of freedom to customize operations. This approach yielded higher degrees of performance, customizability based on variable business requirements, and end-to-end profit optimization.

In one embodiment, clients 10 communicate with ICDC using a standard JDBC API and make plain JDBC method calls to talk to various databases without changing codes. The clients 10 communicate with a query router 20. An autoscaler 30 monitors the queue length log and query response time log and determines if additional nodes should be added by an add/drop controller 40. The controller issues commands to add/drop nodes to a database replication cluster 50 such as a MySQL replication cluster.

Although the system of FIG. 1 shows specific product names, such as MySQL and Active MQ, for example, the system is not limited to those products. For example MySQL can be replaced with other database products such as Oracle, among others.

The ICDC has a Client Data Module that is responsible for maintaining client specific data such as cost functions and SLAs, which are derived from client contracts. Once captured, this information is made available to other system modules for resource and workload management purposes. An ICDC Manager monitors the status of system, e.g. system load, queue lengths, query response time, CPU and I/O utilization. All this information is maintained by the System Data module. Based on system monitoring data the ICDC Manager directs the Cluster Manager to add or remove servers from/to Resource Pool to optimize the operational cost while keeping the SLA costs in check. The ICDC Manager also provides the dispatcher and scheduler modules with the dynamic system data. An Online Simulator is responsible for dynamic capacity planning It processes the client data and dynamic system data to assess optimum capacity levels through simulation. It has capabilities to run simulations both in offline and online modes. A Dispatcher takes incoming client calls and immediately forwards the queries (or jobs) to servers based on the optimized dispatching policy. The dispatching policy is constantly tuned according to dynamic changes in the system, such as user traffic, addition/removal of processing nodes. A Scheduler decides the order of execution of jobs at each server. After the client requests are dispatched to individual servers based on the dispatching policy, individual scheduler modules are responsible for prioritization of dispatched jobs locally by forming a queue of queries, from which a query is chosen and executed in the database. The choice of which query to execute first makes a difference in the SLA penalty costs observed.

The system uses an SLA-based profit optimization approach for building and managing a data management platform in the cloud. The problem of resource and workload management is done for a data management platform that is hosted on an Infrastructure-as-a-Service (IaaS) offering, e.g., Amazon EC2. The data management platform can be thought of as a Platform-as-a-Service (PaaS) offering that is used by Software-as-a-Service (SaaS) applications in the cloud.

In the system model, each server node represents a replica of a database. When a query (job) arrives, a dispatcher immediately assigns the query to a server among multiple servers, according to certain dispatching policy; for each server, a resource scheduling policy decides which query to execute first, among those waiting in the associated queue; and a capacity planning component is in charge of determining how many resources (i.e., database servers) to be allocated in the system. With this abstraction, the system optimizes three tasks: query dispatching, resource scheduling, and capacity planning.

Next, the scheduling component of ICDC system is discussed. The Scheduler has two distinct features: cost sensitive and constraint conscious. In one embodiment using a conventional heuristic cost-based scheduling called CBS, the system evaluates the priorities of the n jobs in the queue individually, in a constant time, and to pick the job with the highest priority. To efficiently evaluate the priority of job i, CBS considers two possible cases: i) the job is served immediately at current time t, which will incur a cost of $c_i(t)$, where $c_i(t)$ is the cost function of job i with the queue wait time t, and ii) the job gets delayed by a wait time, $\tau$, and then served, which will cause the cost of $c_i(t+\tau)$. Since the value of $\tau$ is not known, CBS uses probability density function, and compute the expected cost based on that. Thus, the CBS priority for a job i is, $$p_i(t)=\int_0^\infty a(\tau) \cdot c_i(t+\tau)d\tau - c_i(t) \quad (1)$$

where $a(\tau)$ is a probability distribution to model the waiting time of a job in a queue if it is not served immediately. After computing $p_i(t)$ value, they divide it by the job's service time, since longer job occupies the server for a longer time, delaying other jobs for a longer time period. The exponential function, $a(\tau)=1/\beta \cdot e^{-\tau/\beta}$, works well, and $\beta=1.4$.

Because CBS examines all the jobs in the queue in order to pick the next job to serve, in systems where queues can grow very long and job service time can be very short, CBS can be slow. Another embodiment uses an efficient version of CBS called iCBS (incremental CBS). iCBS uses a priority queue to maintain the list of jobs according to their priority and to dynamically update the priority queue when a new job arrives or an existing one removed from the queue. Because the priority queue is maintained incrementally, iCBS has a logarithmic time complexity.

Figure 2:
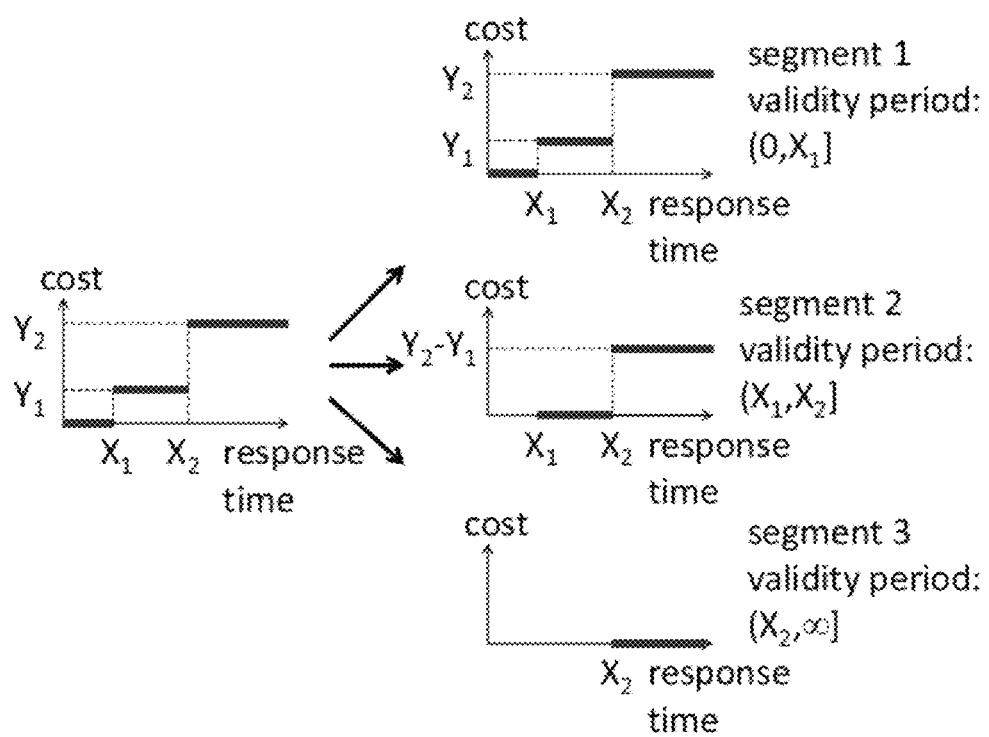
FIG. 2 shows an exemplary cost function segmentation in iCBS.

The iCBS system breaks multiple steps of a cost function into multiple cost functions, as shown in FIG. 2. Each of the segmented cost functions has its own validity period, $(x_1,x_2]$, and it is used to compute the priority of the corresponding job between time $x_1 < x \le x_2$. Segmentation is done by removing and pushing down steps as follows. The first segment is same as the original cost function, and its validity period is the duration of the first step, i.e., $(0, x_1]$. The second segment is obtained by removing the first step and pushing down the rest of steps by the second step's cost (or y-value). Its validity period is the duration of the second step, i.e., $(x_1, x_2]$. This is repeated until the last step is reached, where the cost is defined as zero for its validity period, which is the duration of the last step, i.e., in the example where $(x_2, \infty]$.

As $a(\tau)$ in Equation 1 follows an exponential distribution, the relative priority order between the valid segments of two jobs remains unchanged over time, as long as the segments are still valid. The iCBS process decreases newly arrived jobs' priorities, instead of increasing the existing jobs' priorities, to avoid modification of existing jobs' priorities in the queue, while keeping the relative order the same.

In the iCBS process, for new job arrivals, one segmented cost function is generated for each cost step, and segmented-CBS-priority associated with the validity period of each segment is generated. Then, each priority value is divided by $e^{(t-t_0)/a}$, where is t is current time, and $t_0$ is a fixed time instance, such as system time zero. The segmented-CBS-priority objects are inserted into a priority queue, where the objects are ordered by CBS priority. Among all segments corresponding to the same job, segment i will always have higher CBS priority than segment j, where i<j. The system also adds a nextSegment pointer from segmented-CBS-priority object i to i+1, to chain the segments of the same job.

For job scheduling, at the time of picking the next job to serve, the head of segmented-CBS-priority queue is pulled, which has the highest priority value to see if its validity period has expired or the corresponding job has been scheduled by an earlier segment. In either case, the segment is thrown away, and the next head off the priority queue is pulled, until the system finds the segmented-CBS-priority with an unexpired validity period and also has not been scheduled yet. When found, the system marks the other segments for the same job in the priority queue as scheduled, using nextSegment pointer.

In Constraint-Conscious Optimization Scheduling, iCBS achieves near-optimal cost, but it is prone to starvation as its sole objective is cost minimization. In the real world, however, this may not be desirable. For instance, service providers may want to provide certain bottom line performance guarantee for all jobs, such as a guarantee that all jobs can be finished within ten times of job service time. Also, it may be desired to provide the worst-case performance guarantee for selected VIP customers. These types of hard SLAs need to be enforced, on top of soft SLAs that affect SLA costs.

Figure 3:
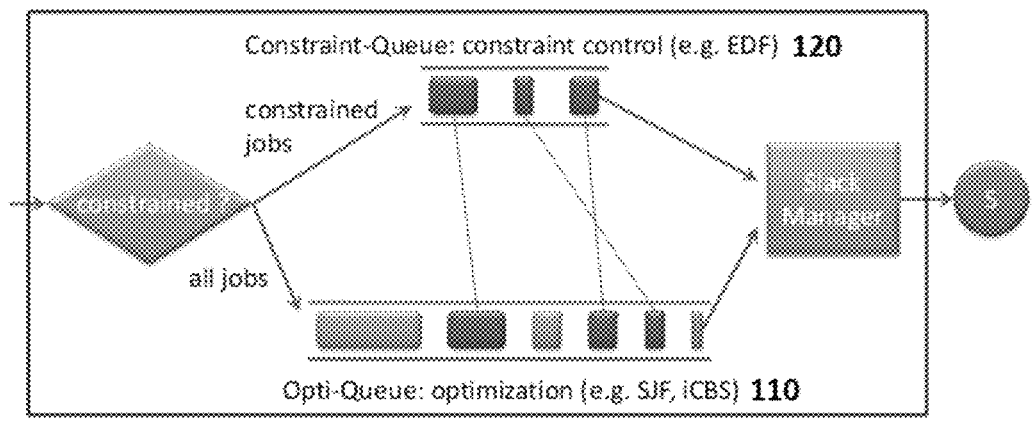
FIG. 3 shows a Constraint-Conscious Optimization Scheduling (CCOS) system.

To meet such needs, a scheduling embodiment of FIG. 3 manages hard SLAs, i.e. deadlines or constraints, and soft SLAs, i.e. optimization metric. This embodiment optimizes the metric while achieving (near-) minimal possible constraint violation. As violation of constraints or deadlines may be unavoidable in general (jobs may arrive in a bursty fashion) the system tries to make the minimum possible number of violations. Only a subset of jobs may have deadlines, which may happen as in the VIP example above. The optimization metric can be the average response time or the above discussed average cost.

FIG. 3 shows a Constraint-Conscious Optimization Scheduling (CCOS) system. CCOS employs dual queue approach: 1) an opti-queue 110 is an optimization queue where all jobs are queued. SJF is used without modification, if response time minimization is the optimization goal, and iCBS is used, if cost minimization is the goal; and 2) a constraint-queue 120 employs EDF (Earliest Deadline First) process. Only the jobs with deadlines are queued here. FIG. 3's CCOS balances between the following two extremes: 1) ignore deadlines (always schedule jobs from opti-queue, achieving the best cost-based results, with uncontrolled deadline violation); and 2) blindly pursue violation control (schedule jobs from constraint-queue whenever it has a job, and attend opti-queue only when constraint-queue is empty). A job is deleted from both queues when it is scheduled from either one. The balance is achieved by observing that deadlines are not always urgent. There may be some job with deadlines in constraint-queue, but it may wait some time, called slack, without violating the deadline. Once known, the system can delay it, and attend opti-queue, to improve optimization metric.

The scheduling system of FIG. 3 manages both hard SLAs, i.e. deadlines or constraints, and a cost optimization metric, that is also call soft SLAs. The operating costs metrics are optimized while possible constraint violations are minimized. This is done by the dual-queue based component where one queue handles the hard SLAs and the other queue handles the soft SLAs, and a system-monitoring component that efficiently monitors those queues.

The main challenge of CCOS is to efficiently monitor the slack of jobs in the constraint-queue, which is defined as follows based on EDF scheduling policy. Given n jobs, $J_i$, $1 \le i \le n$ in constraint-queue, where the job length of $J_i$ is $l_i$, the deadline of $J_i$ is $d_i$ and $d_i \le d_j$ if i<j, the slack of $J_i$ at time t is, $$s_i = d_i - t - \sum_{k=1}^{i} l_k$$

$s_i$ can be determined for $1 \le i \le n$ by iterating jobs in the non-decreasing order of deadlines, and testing the minimum slack, i.e. $\min_i s_i$, against a slack threshold $s_{th}$. If the minimum slack is less than or equal to $s_{th}$, jobs need to be removed from the constraint-queue 120. The only parameter of CCOS is $s_{th}$, and within a large range, i.e. [3*mean-job-length, 10*mean-joblength], the performance is not very sensitive to the parameter value. A data structure named slack tree can be used that supports fast minimum slack monitoring.

Figure 4:
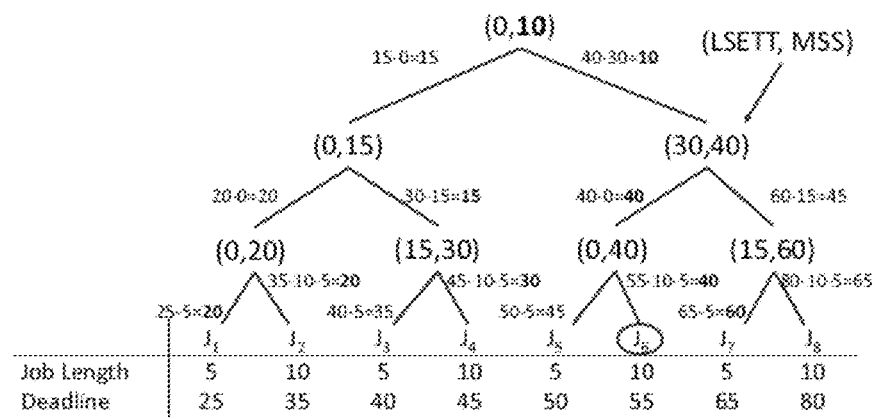
FIG. 4 shows an examplary slack tree used with the CCOS system.

An example of slack tree is shown in FIG. 4. Each leaf node has a job in the order of non-decreasing deadline from left to right. FIG. 4 shows a binary tree for illustration, but slack tree can have arbitrary fan-outs at each node. Each node maintains two values: left sibling execution time total (LSETT) and minimum slack in subtree (MSS). LSETT of a node is the total execution time, or total job length, of left siblings, which are the nodes to the left, sharing the same parent node. MSS of a node is the minimum slack in the subtree rooted at the node.

MSS of a leaf node node, can be determined as $MSS_i = d_i - l_i$, where $d_i$ is the deadline of the node i's job and $l_i$ is the node i's job length. MSS of a non-leaf node node$_i$ is recursively computed as:

$$MSS_i = \min_{node_j \in children of node_i} MSS_j - LSETT_j$$

Root node's MSS represents the minimum slack of the whole tree.

Since the slack tree has all jobs in constraint-queue as its leaf nodes, each insertion and deletion from the queue translates to an insertion and a deletion to the tree. Slack tree efficiently supports these frequent changes.

Figure 5:
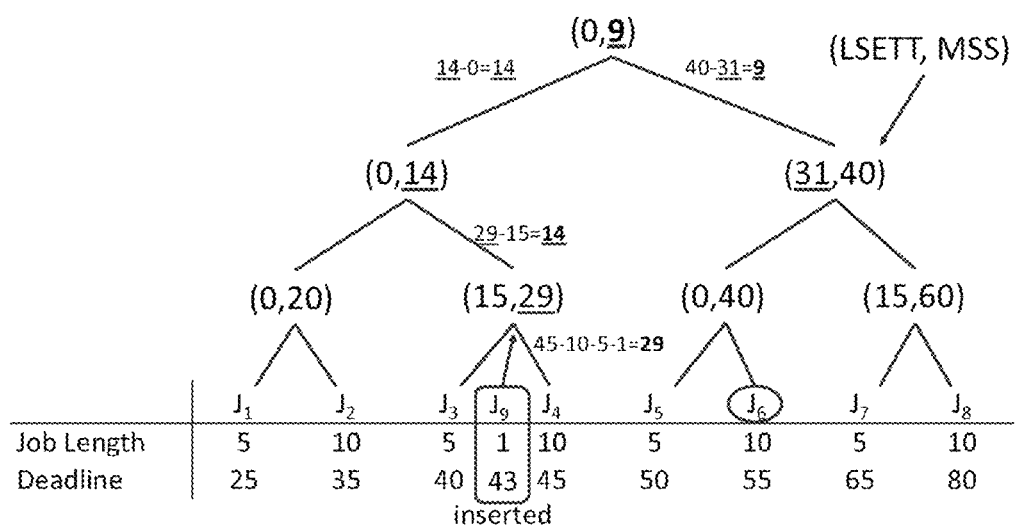
FIG. 5 shows an example where a new job is inserted into the slack tree.

FIG. 5 shows an example where a new job $J_9$ is inserted into the slack tree. Underlined numbers indicate the updated information from FIG. 5. Based on its deadline, $J_9$ is inserted between $J_3$ and $J_4$. This triggers updates of LSETT and MSS of other nodes as follows. At the parent node of $J_9$, it updates MSS value from 30 to 29, as the slack of $J_4$ is reduced by 1. Its updated MSS affects its parent node's MSS as well, updating it from 15 to 14. Now its right sibling node is affected as well, such that LSETT has been increased by 1, from 30 to 31. These two nodes report their updated contribution to the root node's MSS, 14 and 9, respectively, and the root node updates MSS from 10 to 9. Given the node fan-out of k, insertion takes k time at each level, and therefore it takes $O(k \cdot \log_k n)$, or simply $O(\log n)$. Deletion is done in a similar fashion, giving the same time complexity.

The prior discussion address the problem of "which job to serve first" at a single server. With multiple such servers, a central dispatcher needs to make a decision on to which server to send each job, given the objective of SLA penalty cost minimization. Assuming servers are homogeneous, the dispatch decision depends on the scheduling policy employed at the servers.

Next, cost-based dispatching is discussed. Some simple traditional dispatching policies include random and round robin. While being simple, these policies do not perform well, especially given highly variable job length, such as that in long tail distributions. Other more sophisticated policies include Join-shortest-queue (JSQ) or least-work-left (LWL), where the former sends jobs to the server with the fewest jobs in the queue and the latter sends jobs to the server whose the sum of job lengths in the queue is the least among all servers. In particular, LWL is locally optimal policy in that each job will choose the server that will minimize its waiting time, though it does not necessarily minimize the total response time of all jobs. When job lengths are highly variable, as in heavy tail distributions, it has been shown that SITA (Size Interval Task Assignment) often outperforms LWL. In SITA, jobs are dispatched according to its job length, such that server-0 will get the smallest jobs, server-1 will get the next longer jobs, and the last server will get the longest jobs. In choosing the boundaries, SITA-E (SITA with Equal load), the most popular type of SITA, ensures that total work are equal across all servers. However, it has been observed that SITA-E does not necessarily minimize the average response time, and therefore SITA-U has been proposed, which unbalances the load to achieve optimal average response time.

SITA-E or SITA-U, however, may not be the best candidate for SLA-based dispatching, since they are not aware of SLA penalty cost function and do not necessarily minimize the total SLA penalty cost. For instance, SITA-E would send equal load to all servers, but it may be the case that short jobs are more expensive in terms of SLA penalty cost, and the system may want to send less load to short job servers than long-job servers. Likewise, SITA-U may find its own optimal boundaries of splitting jobs according to length for response time minimization, but it may not be the best set of boundaries for cost minimization.

Finding the optimal boundaries for SITA-UC, unfortunately, is not an easy problem. To solve the problem, a simulation-based technique can be used for SITA-UC boundary tuning In an exemplary case of two server dispatching, the system needs to decide a single boundary that divides job size intervals into two. To do this, multiple boundaries can be tested between the shortest and the longest job lengths, and the boundary that gives the lowest cost can be used. An approximate assumption that the boundary-value-to-SLA-cost function is near-unimodal can be used. A function is unimodal if it has only one local minima, which is its global minima; and it is near-unimodal, if it has multiple local minimas, but they are all very close to the global minima.

Tuning of a single boundary is done in two phases. In the first phase, the lowerbound and upperbound of the global minima are located. Starting from the boundary previously found, the process makes exponential jumps to the left, i.e. divide by 2 each time, to find the lowerbound. When $f(0.5x) > f(x)$, then 0.5x is the lowerbound. Likewise, the system performs an upperbound search to the right using exponential jumps, i.e. multiply by 2 each time, and when $f(x) < f(2x)$, then 2x is the upperbound. With these two bounds, the system performs a narrowing down search in the second phase. The system divides the interval bounded by lowerbound $x_{LB}$ and upperbound $x_{UB}$ into three equal-length sections using two division points named $x_1$ and $x_2$. The system then evaluates $f(x_1)$ and $f(x_2)$ using two simulation runs. If $f(x_1) < f(x_2)$, the global minima is within $[x_1, x_2]$ and the next round search is done where this interval is divided into three sections. If $f(x_1) > f(x_2)$, then the global minimal is in $[x_1, x_{uB}]$ and the search is limited to this smaller interval in the next round. This process is repeated until $x_{LB}/x_{UB}$ is greater than a parameter StopPrecision, such as 0.9.

For more than two servers, a single cutoff can be used to divide short jobs and long jobs, which is decided by the above SITA-UC cutoff search process. The servers are divided into two groups, one for short jobs and another for long jobs, and within the group LWL is used. The system can also generalize a dispatching policy in the context where each job may be served by only a subset of servers. In this case, capability groups are set up where jobs and servers belong to one of them, and SITA is run for each capability group.

Capacity planning is discussed next. The capacity planning process allocates resources in an intelligent way, considering factors such as job traffic and profit model, so that the total profit is maximized. The system uses observed job traffic patterns and unit server costs as the basis for the immediate future planning. Simply adding more servers will increase the operational cost. Therefore, the task of capacity planning is to identify the best allocation that maximizes the total profit. Therefore, the task of capacity planning is to identify the best allocation that maximizes the total profit.

Simulation-based capacity planning is used in one embodiment. The system has a discrete event simulator module that is responsible for finding optimum resource allocations through planned simulations.

Capacity planning simulation can be online or offline. In Offline Simulation for Capacity Planning, the simulation receives the given job characteristics, the numbers of servers to handle the jobs, and different operational costs. Simulation-based capacity planning relies on simulations to estimate, in an offline manner, the profits under different server numbers in order to decide the best setting. The inputs to the simulation are the profit model and job characteristics. Those inputs are derived the real query logs for the already running systems. At the initialization stage of a system, certain data statistics, such as the distribution of job inter-arrival time and that of job service time unless they are not provided by the client are assumed. One embodiment of the capacity planner uses most frequently used distributions to initially characterize the data statistics. After that, it effectively refines those initial assumptions by constantly monitoring the system. This feature allows the system not to heavily rely on the client input on the data statistics to start with.

In offline simulations, data characteristics are assumed to be time invariant. Because such an assumption does not always hold true in cloud computing, the simulation results should be updated in real time. If time allows, the offline simulation can be repeated in real time. However, in many cases offline simulations are not acceptable either because it takes too much resource to run them or because it takes too much delay for them to give final answers. In other words, simulations conducted in real time should be quick and take less resource. With a time budget, an online simulation can be done to estimate an approximate optimal solution by using ICDC's online simulation capabilities. The main ideas are (1) instead of multiple simulation runs at a server setting, one run is done, and (2) instead of checking all the possible server numbers, the system checks a subset of server numbers. The cost estimation is then computed from a polynomial regression, which handles both the variance due to the single run and the interpolation for the unchecked server settings.

Figure 6:
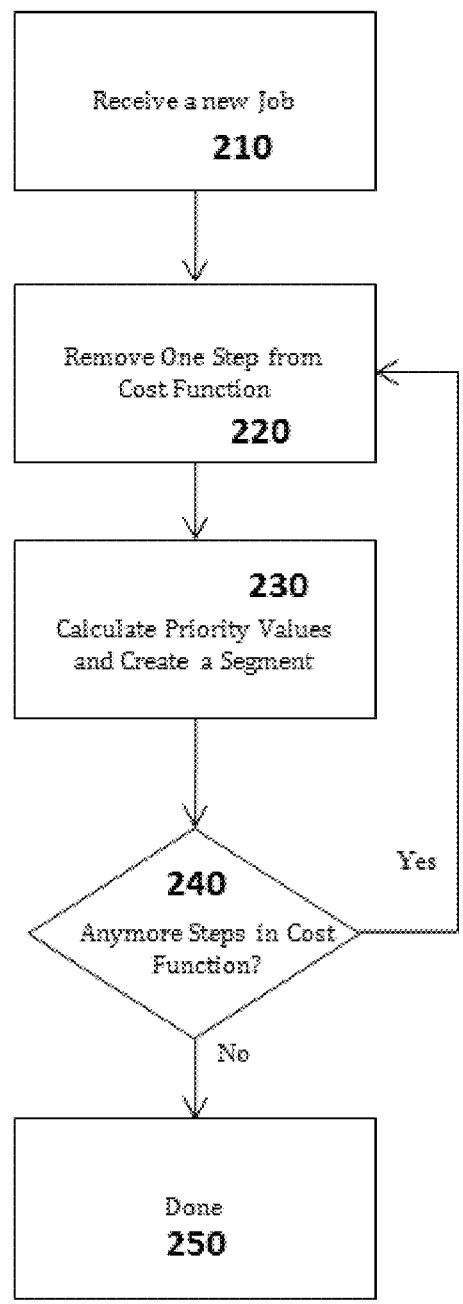
FIG. 6 shows an exemplary process for prioritization and scheduling of incoming jobs based on cost functions.

FIG. 6 shows an exemplary process for prioritization and scheduling of incoming jobs based on cost functions. First, a new job is received (210). Next, the process removes one step from the cost function (220). The process then determines priority values an create a segment (230) as illustrated in FIG. 2. The process checks if there are additional steps in the cost functions (240) and if so, loops back to 220 to handle the step and otherwise exits (250).

Figure 7:
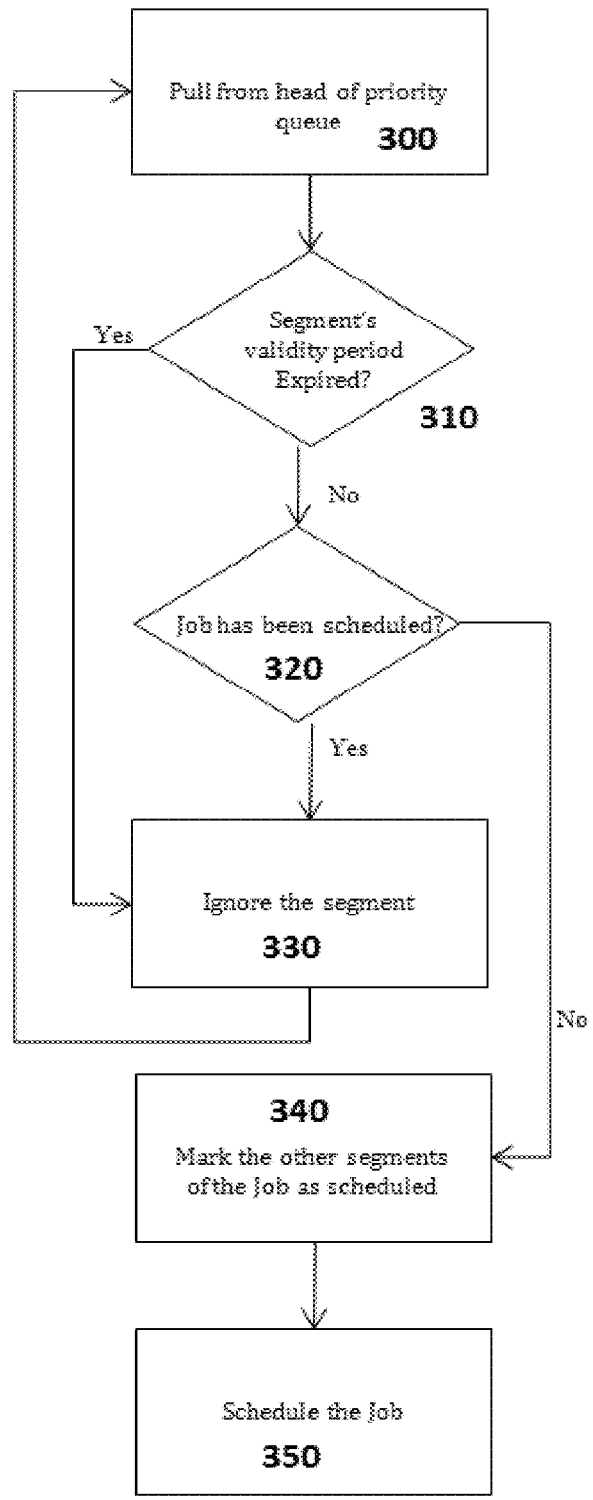
FIG. 7 shows an exemplary process to schedule jobs prioritized in FIG. 6.

FIG. 7 shows an exemplary process to schedule jobs prioritized in FIG. 6. The process pulls a segment from the head of the priority queue (300). The process checks if the validity of the segment has expired (310), and if not, the process checks if the job has been scheduled (320). From 310 or 320, if the segment is invalid or the job has been scheduled, the process ignores the segment (330) and loops back to 300 to handle the next segment. From 320, if the job has not been scheduled, the process marks the other segments of the job as scheduled (340), and schedules the job (350).

The result of the foregoing is a data management platform which is hosted on an Infrastructure-as-a-Service in the cloud, such as Amazon EC2. The system optimizes a database service provider's profit while delivering the services according to customer SLAs. The system identifies the major relevant components of cloud service delivery architecture that need to be optimized to reach this goal.

The system explicitly considers SLA penalty cost function of each job at the core of scheduling, dispatching, and capacity planning problems to achieve an overall cost optimal solution. The system provides a cost-based and constraint-conscious resource scheduling method, called incremental Cost-Based Scheduling (iCBS), for profit optimization. The iCBS makes the cost-based scheduling a feasible option by a substantial efficiency improvement.

The system can be applied to other SLA-based resource and workload management in cloud databases, such as job dropping, preempt-and-restart scheduling, and MPL tuning for the purpose of SLA profit optimization. From the cloud user perspective, SLA design will be a more complicated, but interesting, in the presence of such SLA profit optimizing techniques from the cloud service providers, e.g. how should a client design his/her SLAs so that the provider will accept it, and still get a certain level of services reliably delivered given the competition with other users.

Also, the cloud provider or the client may want to define additional constraints on certain jobs in addition to SLA penalty costs. For instance, cloud-service providers may want to provide differentiated quality of services to certain customers. The reasons could be various: e.g. i) service provider' desire for providing some guarantee against starvation on all customers, such that no jobs will experience a delay greater than a pre-set threshold, ii) explicit customer request in addition to the SLA-based price agreement, and iii) service provider's internal planning among multiple service components of a provider. Such constraint enforcement along with SLA cost optimization is a valuable feature. The method runs on a framework called constraint-conscious optimization scheduling (CCOS) that can schedule jobs such that it enforces desired constraints with a marginal sacrifice on the optimization metric (e.g. SLA penalty cost).

Cost-based dispatching is optimally handled. The system dispatches jobs among multiple servers with a Size Interval Task Assignment (SITA)-based dispatching policy, called SITA-UC, for the purpose of cost minimization, and a SITA boundary tuning process is used.

The system provides an effective and robust capacity planning framework for cloud resource management. The key elements of the framework are two folds: i) the capacity planner does not need to assume any distribution for user traffic and job lengths and ii) it works with cost-based scheduler and cost-based dispatcher modules in a tightly integrated manner to enable end-to-end profit optimization in the system. The system has been tested through extensive testing. Real data of user access data at Yahoo video site, and TPC-H benchmarks are used in the tests.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer with digital signal processing capability to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to schedule jobs in a cloud computing infrastructure, comprising:
    receiving in a first queue jobs with deadlines or constraints specified in a hard service level agreement (SLA);
    receiving in a second queue jobs with a penalty cost metric specified in a soft SLA; and
    minimizing with a processor both constraint violation count and total penalty cost in the cloud computing infrastructure by identifying jobs with deadlines in the first queue and delaying jobs in the first queue within a predetermined slack range in favor of jobs in the second queue to improve the penalty cost metric;
    performing incrementally cost based scheduling (CBS) with a probability density function, and determining a CBS priority for a job i as, $$\int_0^\infty a(\tau) \cdot c_i(t+\tau) d\tau - c_i(t)$$

where $c_i(t)$ is a cost function of job i with a queue wait time t, $\tau$ is a wait time and a ($\tau$) is a probability distribution to model a waiting time of a job in a queue if not served immediately, and
    for new job arrivals, generating one segmented cost function for each cost step, and generating segmented-CBS-priority associated with a validity period of each segment and each priority value is divided by $e^{(t-t_0)/a}$, where is t is current time, and $t_0$ is a fixed time instance;
    adding a next segment pointer from the segmented-CBS-priority object I to i+1 to chain segments of the same job;
    at the time of picking the next job to serve, pulling a head of segmented-CBS-priority queue to see if a validity period has expired or the corresponding job has been scheduled by an earlier segment.

2. The method of claim 1, comprising performing Constraint-Conscious Optimization Scheduling (CCOS).

3. The method of claim 1, wherein all jobs are queued in the second queue.

4. The method of claim 1, wherein the first queue has an Earliest Deadline First protocol.

5. The method of claim 1, comprising forming a slack tree to monitor job slacks in the first queue.

6. The method of claim 5, wherein the the slack tree has all jobs in first queue as leaf nodes and wherein each insertion and deletion from the queue translates to an insertion and a deletion to the tree.

7. The method of claim 5, wherein the slack tree comprises a plurality of leaf nodes, each leaf node representing a job in the order of non-decreasing deadline.

8. The method of claim 5, wherein the slack tree comprises a binary tree or a tree with arbitrary fan-outs at each node.

9. The method of claim 5, wherein the slack tree comprises a plurality of leaf nodes, each leaf node maintaining a left sibling execution time total (LSETT) value and a minimum slack in subtree (MSS) value.

10. The method of claim 9, wherein the MSS value of a leaf node $node_i$ is $MSS_i = d_i - l_i$, where $d_i$ is a deadline of the node i's job and $l_i$, is node i's job length.

11. The method of claim 9, wherein the MSS value of a non-leaf node $node_i$ is recursively computed as a minimum (min) value for all nodes j that are children of node i:

$$MSS_i = \min_{node_j \in children of node_i} MSS_j - LSETT_j.$$

12. The method of claim 9, wherein the root node's MSS represents the minimum slack of the whole tree.

13. The method of claim 1, wherein each leaf node represents a job in a non-decreasing deadline.

14. A system to schedule jobs in a cloud computing infrastructure, comprising:
    a. code for receiving in a first queue deadlines or constraints specified in a hard service level agreement (SLA);
    b. code for receiving in a second queue a cost optimization metric specified in a soft SLA;
    c. code for optimizing operating costs and constraint violations in the cloud computing infrastructure by identifying predetermined jobs with deadlines and slacks in the first queue and delaying the predetermined jobs in favor of jobs in the second queue to improve the cost optimization metric;
    d. code executable on a processor for performing incrementally cost based scheduling (CBS) with a probability density function, and determining a CBS priority for a job i as $$\int_0^\infty a(\tau) \cdot c_i(t+\tau) d\tau - c_i(t)$$

where $c_i(t)$ is the cost function of job i with a queue wait time t, $\tau$ is a wait time and $a(\tau)$ is a probability distribution to model a waiting time of a job in a queue if not served immediately, and
    where, for new job arrivals, one segmented cost function is generated for each cost step, and segmented-CBS-priority associated with a validity period of each segment is generated and each priority value is divided by $e^{(t-t_0)/a}$, where is t is current time, and $t_0$ is a fixed time instance;

code for adding a next segment pointer from the segmented-CBS-priority object i to i+1 to chain segments of the same job;

for job scheduling, at the time of picking the next job to serve, a head of segmented-CBS-priority queue is pulled, which has the highest priority value to see if a validity period has expired or the corresponding job has been scheduled by an earlier segment.

15. The system of claim 14, comprising performing Constraint-Conscious Optimization Scheduling (CCOS).

16. The system of claim 14, wherein all jobs are queued in the second queue.

17. The system of claim 14, wherein the first queue has an Earliest Deadline First protocol.

18. The system of claim 14, comprising forming a slack tree to monitor job slacks in the first queue.

19. The system of claim 18, wherein the slack tree has all jobs in first queue as leaf nodes and wherein each insertion and deletion from the queue translates to an insertion and a deletion to the tree.

* * * * *